United States Patent [19]

Keogh

[11] Patent Number: 4,745,096

[45] Date of Patent: May 17, 1988

[54] BAGASSE RESIDUE FILTER MATERIALS AND ACTIVATED CARBON PRODUCTS AND METHODS OF MANUFACTURING THE SAME

[75] Inventor: Boyd T. Keogh, Sydney, Australia

[73] Assignee: Anjan DVI Limited, British Virgin Isls.

[21] Appl. No.: 748,049

[22] Filed: Jun. 24, 1985

Related U.S. Application Data

[63] Continuation of Ser. No. 194,051, Oct. 6, 1980, abandoned, which is a continuation-in-part of Ser. No. 951,082, Oct. 13, 1978, Pat. No. 4,249,954.

[30] Foreign Application Priority Data

Aug. 26, 1980 [AU] Australia ............................. PE5239

[51] Int. Cl.$^4$ .................... B01J 20/20; B01J 20/16; B01J 20/28; B01D 39/02
[52] U.S. Cl. .................................... 502/413; 55/98; 55/512; 127/55; 201/25; 210/500.1; 210/503; 210/660; 210/679; 210/777; 210/778; 210/807; 502/437
[58] Field of Search ............... 502/413, 417, 437, 410; 201/25

[56] References Cited

U.S. PATENT DOCUMENTS

| | | | |
|---|---|---|---|
| 2,892,240 | 6/1959 | Frankehoff | 502/407 |
| 2,926,137 | 2/1960 | Calvert | 210/500.1 |
| 3,152,985 | 10/1964 | Stoertz et al. | 502/437 |
| 3,436,314 | 4/1969 | Leomor | 201/25 |

Primary Examiner—Paul E. Konopka
Attorney, Agent, or Firm—Darby & Darby

[57] ABSTRACT

This invention relates to products obtained from sugar mill boiler ash, methods of using such products as a filtration material, and/or adsorbent material and methods of manufacturing such products. More specifically, this invention relates to filtration materials, with either a low or relatively high activated carbon content derived from the combustion of sugar cane residues whose characteristics and properties can be preselected and controlled to provide predetermined performance characteristics, and methods of obtaining such products through processing techniques which control the properties of such products. The invention also provides adsorbent materials of very high carbon content useful for applications other than a filter medium.

11 Claims, 5 Drawing Sheets

BAGASSE RESIDUE FILTER MATERIALS AND ACTIVATED CARBON PRODUCTS AND METHODS OF MANUFACTURING THE SAME

This is a continuation of application Ser. No. 194,051, filed Oct. 6, 1980, now abandoned, which is a continuation-in-part of copending application Ser. No. 951,082 filed Oct. 13, 1978, now U.S. Pat. No. 4,249,954.

BACKGROUND OF THE INVENTION (a) Field of the Invention

This invention relates to filtration materials and absorbent products derived from the combustion of sugar cane residues and methods of manufacturing such products.

(b) Prior Art

In domestic and industrial filtration processes and operations minerals such as diatomaceous earth, diatomite, infursorial earth, tripolite and kieselughr are commonly used as a filter media or filter aid. For example, finely powdered diatomaceous earth is used to precoat the filter elements in swimming pool filters, to aid in the filtration of the water pumped from the pool and returned to the pool after filtering.

The development of new filtration materials has been hampered by economic considerations in that substitute materials for the well-known filtration products must be economically competitive, have a filter cycle at least as good as products now on the market such as diatomaceous earth and have no adverse environmental consequences.

Heretofore, in the process of extracting sugar, when cane stalks are subjected to crushing and other processing in a sugar mill, the cane residues or bagasse (the later term will be exclusively used hereinafter, for convenience) become available in substantial quantities. It has been a problem of the art to find a suitable use for this large volume, low value bagasse by-product material. Such uses have included the manufacture of paper and certain building materials. However, the principal use of bagasse has become the employment of such material as a fuel for the sugar mill boilers. Bagasse (typical analysis is sugar 3%, fibrous material 50%, and water 47%—percentages by weight) which is fed to sugar mill boilers burns to an ash made up of undergrate or furnace ash of low carbon and unburnt or partially burnt fibre content and fly ash which, because it tends to be carried away in the gas stream before combustion is fully completed, can be of significantly higher carbon and fibre content. This resulting boiler ash was generally viewed as a waste product and therefore discarded apart from some restricted use as a soil conditioner and as a rather poor quality lightweight aggregate in the manufacture of concrete and in road construction.

SUMMARY OF THE INVENTION

This invention is predicated on the discovery that the particulate material from sugar mill boiler ash can be used as a filtration material, and in applications requiring a high activated carbon based product.

Accordingly, it is an object of the present invention to provide filtration and/or adsorbent products derived from sugar mill boiler ash.

It is another object of the present invention to provide filtration materials derived from sugar mill boiler ash whose filtration characteristics and properties can be modified by adjusting the proportion of activated carbon content and very fine particulate material present in such products.

A further aspect of the present invention relates to filtration materials having a wider particle size distribution than some currently used commercial products thereby providing a product with an improved filter cycle in comparison to such commercial products.

It is a further aspect of the present invention to provide products derived from sugar mill boiler ash having a high activated carbon content for use in commercial applications requiring an adsorbent material.

A still further aspect of the present invention relates to methods of filtering liquids using a filtration material derived from sugar mill boiler ash.

Additional aspects of the present invention relate to processes of recovering filtration products and adsorbent products from sugar mill boiler ash.

DETAILED DESCRIPTION OF THE INVENTION

In the conventional process of extracting sugar from sugar cane stalks, the bagasse which is fed to a sugar mill boiler burns to an ash which is made up of two basic types of ash. One ash is referred to as undergrate or furnace ash which is of low carbon content (usually less than about 1%) and generally has a particle size of greater than about 1700 microns (including large agglomerated lumps) although it may contain some particulate material between about 300 and 1700 microns. This undergrate or furnace ash is principally composed of well-burnt bagasse but also includes some unburnt or partially burnt bagasse. The other type is fly ash, which because it tends to be carried away in the gas stream before combustion is fully completed, is naturally of significantly higher carbon and fibre content. The fly ash generally has a particle size below about 1700 microns, the bulk of which is below about 375 microns. A typical chemical analysis of sugar mill boiler ash shows the following content:

| | |
|---|---|
| $SiO_2$ | 73% |
| $Al_2O_3$ | 6.7% |
| $Fe_2O_3$ | 6.3% |
| CaO | 2.8% |
| MgO | 3.2% |
| $P_2O_5$ | 4.0% |
| $Na_2O$ | 1.1% |

The chemical composition of sugar mill boiler ash can vary somewhat depending on the soil conditions in the different geographical regions where the sugar cane is grown. Different soil conditions may cause a variation in the alkalis found in the boiler mill ash.

As used herein the word "filtration material" encompasses the state of the art expressions "filter aid", "filter media" or "filter powder".

The filtration materials of the present invention can be derived from any sugar mill boiler ash no matter where the location or the conditions employed for combustion of the bagasse fibre. The principal variation in the combustion product of bagasse fibre from sugar mill to sugar mill is the rate of feed of the bagasse fibre to the boiler. For example, where a sugar mill has a surplus of bagasse fibre which must be disposed of, there is sometimes a tendency to feed the boiler with bagasse at a much higher rate than provided for in the original boiler design. This results in an increase of partially or not well burnt fibres resulting from the combustion of the bagasse thereby providing sugar mill boiler ash of higher activated carbon content. As used herein reference to activated carbon content means the adsorptive properties of a particular product. In contrast to the foregoing example, in some cases where an efficient sugar mill does not have an excess of bagasse fibre available, and is endeavoring to minimize the use of any supplementary oil or coal fuel, considerable care is taken in the combustion control of the boiler. In these circumstances, the bagasse fibre is very well burnt, and the resulting ash has a very low activated carbon content.

The present invention allows the production of filtration materials from any of the foregoing ashes (i.e. low or high activated carbon content), and depending on the required characteristics of the filtration material such as its flow rate index and adsorptive properties, one can, by selecting the particular raw material ash to be used and/or varying the processing procedures and controls as described later herein, produce (a) filtration products with a low activated carbon content (b) filtration products with high activated carbon content, and (c) a carbonaceous adsorbent material of very high activated carbon content which has uses other than as a filtration material. The filtration materials with a low activated carbon content are generally those having a loss on ignition (at 900°) not exceeding about 12 percent by weight and the filtration materials with a relatively high activated carbon content are those having a loss of ignition in the range of about 12 to about 30 percent by weight. The loss on ignition is a measure of the combustible material in the product which for all intents and purposes is a measure of the carbon content.

The foregoing filtration materials are predominantly composed of the well burnt particulate material (low carbon content) resulting from the combustion of the bagasse fibre which principally comprises that fraction of the particulate material in the boiler ash which has a micron size below about 375 microns. The low carbon content filtration product obtained from the burnt particulate material is characterized by preferably having about 90 percent by weight of its ash particles below 375 microns and containing a preselected predetermined quantity of very fine particulate material i.e. below about 12 to about 15 microns which controls the desired flow rate index for the filtration product and provides the means for modifying this index. Generally it is desirable to have a flow gate index in excess of 1 for swimming pool applications. The fine ash particle content below about 12 to 15 microns in the filtration product is controlled by separating out in the recovery of the filtration products from the sugar mill boiler ash those patticles having a size greater than about 15 to 20 microns from those having a smaller particle size and subsequently recombining some of the less than 12 to 15 microns size particles with the low carbon content particulate material having a particle size in the range of from about 12 to 15 microns to about 375 microns. The quantity of fine particulate material i.e. below about 12 to 15 micron size that is included in the filtration product permits alteration and selection of a flow rate index for the filtration product which is most desirable for the particular commercial application for the filtration product. Generally, the flow rate index for the filtration products of the present invention is in the range of about 0.2 to about 10. In order to have an acceptable flow rate index the filtration products should not contain in excess of 25% by weight (dry basis) of ash particulate material below about 12 to 15 micron size.

A filtration material of relatively high activated carbon content (e.g. about 12 to 30% by weight loss of ignition) comprises an admixture of (a) boiler ash derived from the substantially burnt sugar mill boiler ash which is of relatively low activated carbon content and comprises particulate material of which approximately 90 per cent by weight has a particle size below about 375 microns and from which the substantial majority of the particles below about 12 to 15 microns have been removed, and (b) a predetermined quantity of activated carbon particulate material which is derived from partially burnt or charred bagasse fibre found in the sugar mill boiler ash having a particle size in the range of from about 375 to about 1700 microns. In the recovery of the filtration products of my invention the fraction of sugar mill boiler ash having a particle size between about 375 to about 1700 microns is preferably separated by mechanical means from that sugar mill boiler ash having a particle size below about 375 microns. The fraction having the larger particles (i.e. 375 to 1700) which is of high activated carbon content is then ground in a mill or similar device to a smaller particle size such that approximately about 90 percent of the particulate material is below approximately 375 microns. A predetermined quantity of this activated carbon material may then be combined with the recovered relatively low carbon content filtration material described about to provide a final product which has a relatively high carbon content i.e. between about 12 and 30 percent by weight loss on ignition. This product, as is the case with filtration products of low carbon content, should have a flow rate index between about 2 and about 10. This flow rate index is controlled in the same manner as previously described by controlling the proportion of fine particulate material below about 12 to 15 microns present in the product.

For swimming pool applications, the filtration products of my invention preferably have a flow rate index between about 1.0 and 3.5 and have a low activated carbon content, i.e. less than about 12% by weight loss on ignition, to avoid adsorbing chlorine from the pool water. Where the filtration product is to be used in a system where the adsorption of colors, odors or organic or inorganic materials is required, a filtration material is used having a high activated carbon content because good adsorptive properties are desirable in such applications.

A further product that has commercial application which is derived from the sugar mill boiler ash is a carbonaceous product very rich in activated carbon, generally in excess of 40% by weight loss on ignition, which is useful for applications requiring an adsorbent material. This carbonaceous fraction is made up of the partially burnt or charred bagasse fibre predominantly composed of particles in the range of about 375 to about 1700 microns which has been previously described. This carbonaceous fraction, in addition to being an additive to the low carbon content filtration material, has utility without further treatment as an adsorbent or this material can be ground to a fine powder with a high surface area and used for commercial applications requiring activated carbon adsorbent materials. In boiler mill ash which has a very high level of partially burnt or charred bagasse fibre and thus a large proportion of activated carbon content it is not even necessary to separate out those particles having a micron size below about 375 where the product is used as an adsorbent. Where, however, the particular sugar mill ash does not have a particularly large proportion of partially burnt or charred bagasse fibre in comparison to the well burnt particulate material having a particle size below about 375 microns, it is desirable to separate the predominently carbonaceous fraction (about 375 to 1700 micron particle size) from the relatively lower carbon content fraction generally having a particle size below about 375 microns.

The filtration and adsorbent materials of the present invention can be obtained from sugar mill boiler ash by either a dry process, wet process or a combination of such techniques. The dry process steps generally involve drying, crushing and screening the boiler mill ash as (or if) appropriate and grinding to an appropriate fineness followed by dry classification. The wet process is based on forming an ash slurry by conventional processing techniques various fractions of particulate material of different micron size. The wet process will be described in detail hereinafter.

The preferred method of obtaining the filtration and adsorbent materials of the present invention involve using a slurry process. This process which will be described in general terms with reference to the flow diagram identified as FIG. 1 comprises transferring boiler ash from a sugar mill boiler in the form of a slurry obtained by mixing the ash with water in a tank 8. The ash slurry may be fed to a settling pond (not shown) from which it can, when desired, be transferred to the processing plant. When the ash slurry reaches the processing plant it is fed at a controlled rate to a receiving vessel 10 where additional water is introduced as necessary. This rate of feed is a function of the size of the vessel. The rate of feeding is geared to the rate at which the slurry is extracted from the vessel and pumped to the screen. The receiving vessel 10 is so designed that it takes the form of a thickener to bring the concentration of the ash solids in the water to the desired level, which is preferably in range of 10% to about 30% by weight. The concentration level of ash solids in the thickener vessel will also depend on the design of the extraction pump and the size of the screen referred to hereinafter.

Figure 1:
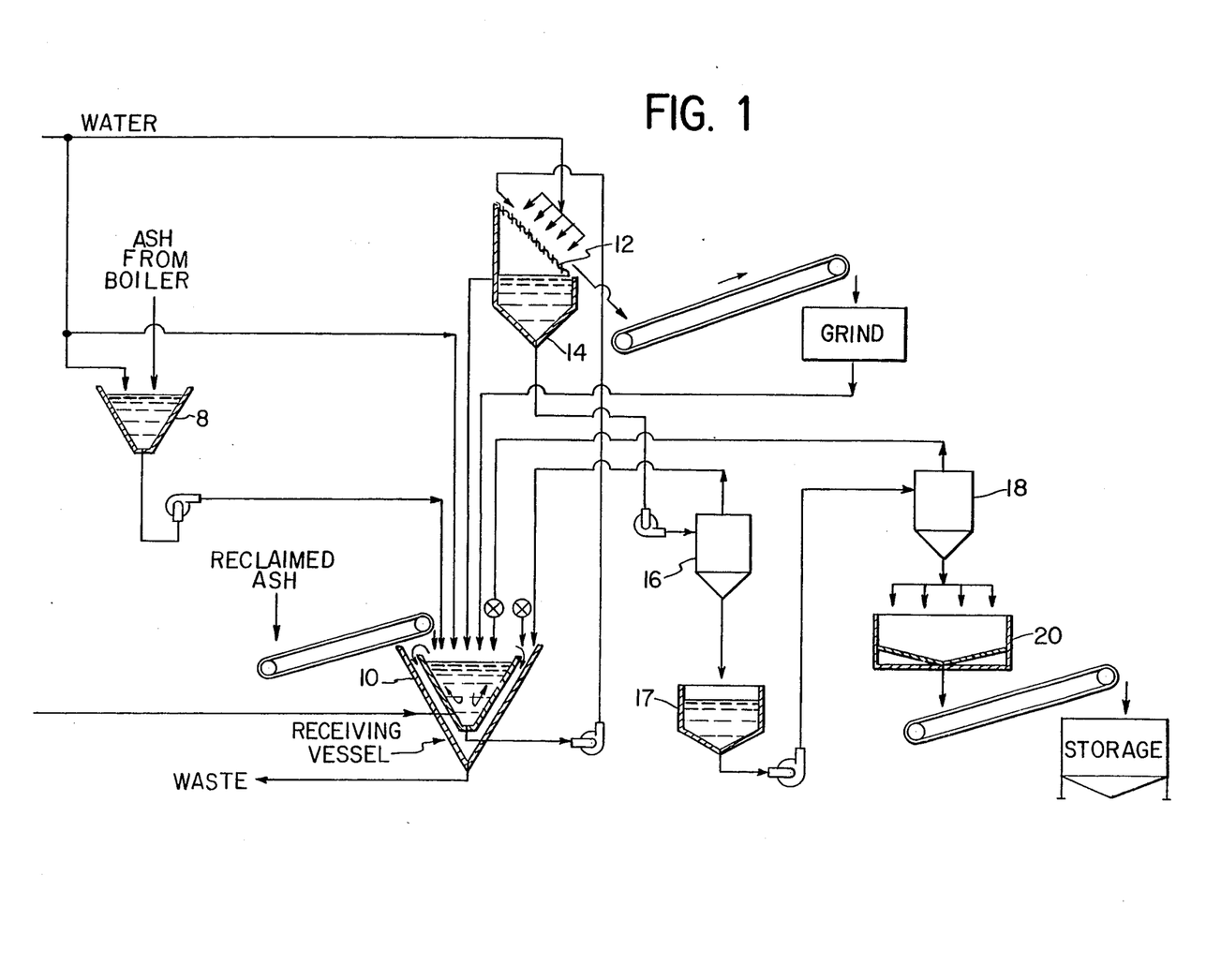
FIG. 1 is a general flow diagram illustrating a wet process for obtaining the products of the present invention.

In addition to functioning as a thickener, this receiving vessel can also act as a hydroseparator. When used as a hydroseparator water flows upwards in the vessel, counter-current to the ash particles which are settling towards the bottom of the vessel. The use of the thickener vessel is preferable but not essential to the process. Its purpose is to build up a suitable concentration or content of ash particulate matter in the slurry to ensure having adequate yield of the filtration material from the processing plant in order to make recovery and use of the filtration product economically feasible. Thus, the ash from the boiler or settling pond could be fed directly to the single or double deck screen described therein. However, the ash slurry from a sugar mill generally has a solid content of less than one percent which would lead to lower yields of filtration material without the use of the thickener step to increase the concentration of the solids to be processed into the filtration and activated carbon adsorbent materials of the present invention.

By controlling the upwards velocity of the water and the feed rate of the slurry of boiler ash to the hydroseparator it is possible to extract from the bottom of the hydroseparator that large proportion of the boiler ash which is made up of predominantly well burnt ash particles, with a comparatively low activated carbon content. This particulate material generally has a loss of ignition below about 12 percent by weight. The unburnt fibres, partially burnt or charred fibres and the small light carbon particles can be separated from the bulk of the ash particulate material and carried upwards with the flow of water over a weir and discharged either to waste or to a separate collecting vessel. This separation procedure enables one to control the activated carbon content of the filtration material of the present invention. The greater the upwards velocity of the water in the hydroseparator, the lower will be the proportion of particulate material of high carbon content in the recovered filtration product. A higher water velocity causes greater turbulence in the hydroseparator which results in a greater proportion of partially burnt or charred fibres being carried with the overflow from the hydroseparator. Conversely, a reduction in upwards water velocity reduces the proportion of the foregoing particulate material being carried with the overflow thereby resulting in a filtration product with a higher activated carbon content. As an example of a suitable water velocity it has been found that passing water through the hydroseparator at the rate of 32 liters per minute causes an upward flow of water at top of the hydroseparator of 50 mm per minute. At the foregoing velocity the underflow from the hydroseparator contains a filtration material which is of relatively low carbon content.

The ash slurry extracted from the bottom of the hydroseparator or thickener vessel is then pumped as a slurry to a vibrating screen 12 which may be either a single deck or double deck screen. The selection of either a single deck or double deck screen is dependent on the characteristics of properties desired for the filtration material and controls the activated carbon content and the particle size of the filtration product. Thus, when a single deck screen is used the screening means may comprise a screen cloth having the same size apertures. Such a screen cloth may have apertures anywhere from 375 microns or less (e.g. 300, 212, 180, 150, 75, etc.). For illustration purposes and convenience only, reference is made in FIG. 1 to a vibrating screen having 300 micron size apertures. This screen causes a separation of those ash particles having a particle size below 300 microns from those particles having a particle size greater than 300 microns. The oversize material separated by the screen which did not pass through consists primarily of a small proportion of unburnt fibres, of the order of about 1% to about 3% by weight of the total raw material fed to the vibrating screen and of the order of about 3% to about 10% by weight of charred fibres based on the weight of the total raw material feed. To ensure that particles smaller in size than 300 microns are not carried away with the particles of a size greater than about 300 microns, water sprays are directed onto the screen deck which results in the particulate material of less than about 300 micron size being washed through the screen apertures.

If desired, as previously indicated, a double deck screen may be used in place of the single deck screen. The purpose of the double deck screen is to permit the recovery of a larger particle size fraction from the boiler ash which has been found to contain a substantial quantity of activated carbon thus making it useful for commercial applications requiring a filtration product of high activated carbon or as an adsorbent product. This fraction is separated from the boiler ash by using a second screen preferably with 1700 microns size apertures. Obviously, if desired, this screen can be of smaller or larger micron size (e.g. 1900, 1800, 1500, 1300, 1000, etc.). For illustrative purposes herein, the second screen will be identified as one having 1700 micron size apertures. The ash particulate material ranging in size from about 300 to about 1700 microns is recovered on top of the lower deck 300 micron screen. The oversize ash particles, i.e. greater than about 1700 microns, are recovered on top of the 1700 micron size screen and processed in the same manner as the oversize material using only a single screen deck.

The boiler ash particles which are smaller than about 300 microns together with the process water and spray water are collected in a hopper 14 below the screen deck. If the amount of process water is excessive, any overflow from the screen hopper can be returned in a closed circuit to the hydroseparator for reuse.

The partially processed ash having a particle size of less than about 300 microns which makes up the underflow from the hydroseparator 10 is preferably extracted again in a slurry form from the screen hopper 14 and pumped at a solids content in the range of 5% to about 20% by weight, preferably about 10% by weight, to a first stage hydrocyclone station 16. The purpose of the hydrocyclone is to classify the ash particles and remove a substantial proportion of the very fine particles i.e. those smaller than about 12 to 15 microns. The selection of a suitable hydrocyclone to achieve the desired particle separation is within the skill of the art. A suitable hydrocyclone is a "Warman" Series R 3 inch cyclone. The overflow from the first stage hydrocyclone 16 which contains the fine particles having a size of less than about 12 to 15 microns can either flow to waste or to a further collection point and if desired can be combined with the hydroseparator overflow. The overflow can be added to the hydroseparator to build up the fine particles as a means for controlling the flow rate index.

The underflow from the first stage hydrocyclone, which is the bulk of the solids fed to the hydrocyclone, is collected in a tank 17 from which it is pumped in slurry form at a solids content in the range of about 5% to 20% by weight, preferably 10% by weight to a second stage hydrocyclone station 18. The ash solids in this slurry have a particle size in the range of about 12 to 15 to about 300 microns. The particle classification process carried out at first hydrocyclone station 16 is repeated again with the use of a second "Warman" Series R 3 inch cyclone station 18 so as to provide substantially complete removal of ash particles having a micron size smaller than about 12 to 15 microns. These fine particles are handled in the same manner as previously described in connection with the first stage hydrocyclone 16.

The use of a second hydrocyclone station 18 is not critical to the process but is preferred, particularly where the sugar mill boiler ash used to obtain the filtration materials of my invention are derived from a settling pond rather than being pumped directly from the sugar mill boiler. It has been found that sugar mill boiler ash reclaimed from a settling pond generally has a high proportion of particles of less than 12 to 15 microns which therefore makes it desirable to repeat the first stage hydrocyclone particle classification and separation in order to assure that the predominant portion of the fine particulate material is separated from the underflow in the hydrocyclone in order to obtain a suitable flow rate index. The choice of using one or both hydrocyclones in the process is also dependent on the flow rate index desired for the filtration produce. Thus, where a relatively low flow index is desired, i.e. less that about 1, a greater proportion of the fine particulate material may be retained in the filtration product thus making it unnecessary to process the product through two hydrocyclone stations. In contrast, where a high flow rate index is desired processing through two hydrocyclone stations is generally desirable. There are also some sugar mills where the boiler ash contains only a very small number of fine particles and in such case it is possible to eliminate the use of any hydrocyclones to produce a suitable filtration product.

The underflow from the second stage hydrocyclone station is in the form of a concentrated slurry of water and fully processed boiler ash particles. This underflow is then dewatered by conventional means such as by a rotary drum vacuum filter 20. Other conventional dewatering or drying devices may be used. The dewatered product, which is in the form of filter cake, is scraped from the vacuum filter and conveyed to a storage area. This product has a moisture content in the range of about 20% to about 30% by weight and is usable in this form as a filtration material for swimming pool filtration. Where a lower moisture content is required or desirable such as to either facilitate automatic packaging or by the product specification for some filtration processes other than swimming pools, the recovered filtration materials can be subjected to conventional drying means such as a fluid bed dryer for partial or total drying.

The overflow from the first ahd/or second state hydrocyclones can be dewatered in the same manner as previously described to recover a product with only a very small quantity of ash particles greater than about 12 to 15 microns. These fine ash particles can be either discarded or used to modify the flow rate index properties of the filtration product by adding a predetermined quantity of these fine particles to the filtration product composed of particles of which approximately 90% by weight are in the range of about 375 to about 12 to 15 microns.

The fraction of boiler ash particulate material separated out on a double deck screen having a particle size in the range of about 300 or 375 microns to about 1700 microns is principally composed of charred or partially burnt bagasse fibres having a high activated carbon content. This material can be used as an activated carbon product in the form in which it is screened from the boiler ash slurry or can be reduced in particle size by conventional grinding means such as for example wet grinding in a rod or ball mill followed by screening and drying to a fine activated carbon powder preferably having a particle size in the range of about 12 to 15 to about 300 to 375 microns. This fine activated carbon powder can be mixed or blended in a measured quantity with that ash fraction that consists essentially of the low activated carbon particles of the present invention to provide a filtration product requiring a relatively high carbon content which is necessary for filtration of certain liquids requiring adsorption of colors, odors, etc. Alternatively, the high activated carbon fraction described above can be combined with the low activated carbon fraction represented by the underflow from the hydroseparator and together passed through the first or second stage hydrocyclones.

As previously indicated, the proportion of activated carbon particles or fibres present in the mill ash discharged from the boiler of a sugar mill varies greatly from case to case, and depends upon such factors as the design and operating conditions of the boiler, the combustion control in the boiler and the moisture content of the bagasse fired to the boiler. Thus by sampling and testing boiler ash discharged from various sugar mill boilers, it is possible to select ash having particularly high levels of activated carbon particles. The high carbon content raw material can be used to produce a filtration product having a higher proportion of activated carbon or the activated carbon content can be separated out as heretofore described and made commercially available for applications requiring an activated carbon product. It has been found that in a few cases the proportion of activated carbon particles in the boiler ash is so high that the ash needs little or no further processing to be used as an activated carbon product. For example, boiler mill ash of very high proportion of activated carbon particles can be obtained by combining bagasse and the residue obtained in the manufacture of furfural. The ash resulting from the combustion of this material usually results in a high carbon content material. The residue from the furfural extraction process is obtained by using bagasse in the furfural extration process and returning the furfural residue from this process to the sugar mill boiler where it is combined with untreated bagasse for use as a fuel in the boiler to produce sugar mill boiler ash high in activated carbon content. Reference in this specification and the attached claims to bagasse ash is intended to include ash from the combustion of such furfural residue alone or in combination with untreated bagasse.

The recovery of the filtration produce described herein can also be achieved by essentially dry process techniques. For example, the sugar mill boiler can be removed from the boiler or a settling pond, dried by conventional means and screened to separate out oversize particles such as those having a particle greater than about 1700 microns. If desired, the oversize material can be crushed to below 1700 micron size and combined with the initial particulate matter which passed through the 1700 micron size screen. The ash based product can be further fractionated by separating through screening those particles having a size in the range of about 375 to about 1700 microns which are high in activated carbon content from those ash particles of less than about 375 microns which are relatively low in activated carbon content. This low carbon content particulate material derived from sugar mill boiler ash is treated by dry process techniques such as an air classifier to remove a substantial majority of the particulate material having a particle size below about 12 to 15 microns.

The following examples are intended to be illustrative of the process of the present invention for the preparation of the filtration and activated carbon products. This process is described with reference to the flow diagram shown in FIG. 2. The reference to the 300 and 1700 micron screens referred to in Examples 1 and 2 is for illustrative purposes only and other screen sizes may be used.

EXAMPLE 1

Figure 2:
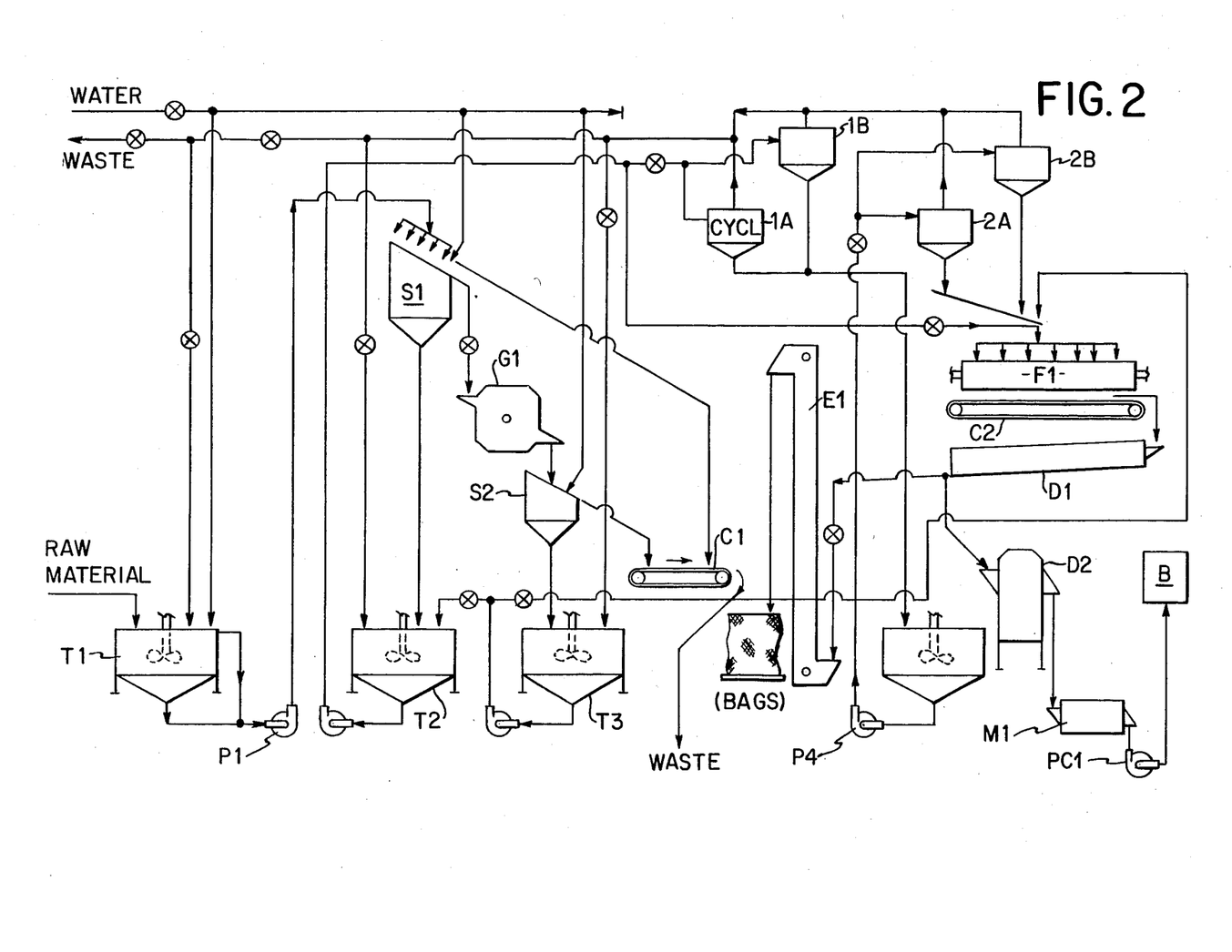
FIG. 2 is a detailed flow diagram illustrating a preferred process for obtaining the products of the present invention.

Raw material mill ash obtained for a sugar mill plant in Queensland, Australia is transported and discharged into a receiving tank $T_1$ equipped with slurry pump $P_1$. This tank is of sufficient size to enable the processing of 10,000 kg. of the raw mill ash per eight hour day. The ash slurry from $T_1$ and the overflow water are pumped by slurry pump $P_1$ to a vibrating double deck screen $S_1$. This ash slurry has a solid content of about 30% by weight. The top deck of $S_1$ is equipped with a mesh cloth having apertures of 1700 microns and the lower deck is equipped with a mesh cloth having apertures of 300 microns. The oversize fraction (i.e. larger than 1700 microns) of ash slurry which constitutes a maximum of 5% by weight of the total slurry solid content, is discharged to waste conveyer $C_1$. The middle fraction from $S_1$ which comprises particulate material in the range of about 300 to 1700 microns and constitutes a maximum of about 15% by weight of the total slurry solid content, is discharged to a disc grinder $G_1$ or equivalent apparatus. The undersize fraction or smallest size from $S_1$ which passed through the lower vibrating screen and comprises particulate material of less than about 300 microns is discharged to thickener tank $T_2$ equipped with slurry pump $P_2$. The disc grinder $G_1$ grinds the high activated carbon fraction (i.e. about 300 to 1700 microns) to a smaller particle size so that the bulk of the ground particulate material will pass through cloth mesh screen $S_2$ having apertures of 300 microns. Any oversize material (i.e. larger than 300 microns), which is usually siliceous material, that remains on screen $S_2$ is discharged to waste conveyor $C_1$. The undersize (i.e. less than 300 microns) high activated carbon content material that passed through screen $S_2$ is fed to thickener tank $T_3$ equipped with slurry pump $P_3$. The high carbon content ash slurry in tank $T_3$ has a solids content of about 30% to about 50% by weight and is pumped by slurry pump $P_3$ for blending with the low carbon content ash slurry in tank $T_2$ or in a separate operation can be pumped directly to a vacuum filter which dewaters the high carbon content particulate material as described in Example 2. The blended mixture of high and low activated carbon content sugar mill boiler ash having a particle size of less than 300 microns is pumped by slurry pump $P_2$ from tank $T_2$ through 3 inch "Warman" hydrocyclones 2A and 2B only or through 3 inch "Warman" hydrocyclones 1A and 1B and then via tank $T_4$ and sump pump $P_4$ through hydrocyclones 2A and 2B. The solid content of the slurry material transferred from tanks $T_2$ and $T_4$ to the hydrocyclones is about 5 to 10% by weight. The solid concentration is increased to 30 to 50% by weight if no desliming (i.e. removal of fine particulate material) is required. The hydrocyclones separate out the finer particles having a size of less than approximately 12 to 15 microns from the ash slurry. The overflow from hydrocyclones 2A and 2B are discharged to waste or recirculated by gravity to either of tanks $T_1$, $T_2$, or $T_3$. The underflow product from hydrocyclones 2A and 2B made up of ash particles having a micron size in the range of about 12 to 15 to about 300 microns if fed via a spreader launder to rotary drum vacuum filter $F_1$ for removal of water. The resulting filter cake which normally has a moisture content of about 25 to 27% by weight and a miximum moisture content of about 32% by weight is conveyed from vacuum filter $F_1$ via conveyor $C_2$ to rotary drier $D_1$ for partial drying of the product to a moisture content of no greater than about 10% by weight. The dried product from $D_1$ is fed by a bucket elevator $E_1$ into bulker bags sitting on pallets.

EXAMPLE 2

The process of Example 1 was followed except that the ash material collected in tank $T_3$ is pumped by slurry pump $P_3$ via feed launder to vacuum filter $F_1$. This ash slurry is dewatered by vacuum filter $F_1$ and conveyed by conveyor $C_2$ to rotary dryer $D_1$. After partial drying in $D_1$ to a moisture content of no greater than about 10% by weight, the material is further dried in a fluid bed drier $D_2$ and discharged to ball mill $M_1$. The fully dried, high in activated carbon powder, is ground in ball mill $M_1$ to a particle size providing a specific surface area preferably greater than 300 $m^2$/kg and then discharged to a pneumatic conveyor $PC_1$ which transports the material to storage silo B from which it can be dispensed and packaged for commercial applications requiring an activated carbon product. Thus, in the process of this example, the high carbon content particulate material is not blended with the low carbon content ash material in tank $T_2$ as described in Example 1, but processed independently so that the process yields separately, both a filtration product and an activated carbon product. A predetermined quantity of the activated carbon product can be added to and mixed with the filtration product where it is desirable to use a filtration product having high adsorptive properties.

The following tests demonstrate the filtration and adsorbent properties of the products of the present invention.

Two examples of filtration products having similar filtering speed characteristics were prepared in accordance with Australian Patent Application No. PD 2067 from the burning of bagasse in the boilers of the "Rarawai" mill in the Fiji Islands, and the "Illovo" mill in South Africa. Such filtration products are identified herein as Samples Nos. 066 and 129, respectively.

A 1 kilogram sample of sugar mill boiler ash from the "Rarawai" mill, was dry screened on a 150 micron sieve, the less than 150 micron size fraction of ash particulate material being designated as Sample 066. A 3 kilogram sample of sugar mill boiler ash from the "Illovo" mill was wet screened on a 212 micron sieve, the less than 212 micron size fraction of ash particulate material being dewatered by passing over a vacuum filter, so the resulting ash product, designed as Sample 129, had a moisture content of 25.9%.

Comparative filtering tests were conducted to compare the performance of filter aids Samples Nos. 066 and 129 ("Mill Ash 1.0") with "Celite-Aquacel", a diatomaceous earth filter aid widely used commercially as a precoat filter aid for swimming pool filtration and designated herein as Sample No. 068.

The tests were conducted on a domestic "in ground" reinforced concrete swimming pool, 12 meters long by 5 meters wide. Water was drawn from a surface skimmer situated approximately 8 meters from the shallow end of the pool, and from a main floor drain in the deep end. Water from both locations was combined and delivered through approximately 15 meters of nominal 1.5 inch PVC suction piping with six bends to a 0.92 HP "Filtrite" bronze centrifugal pump. The pump delivered the raw water through a "Filtrite" filter unit, comprising eight filter leaves with a total net filtering area of 21 square feet of filter cloth supported on plastic frames (D.E. Filter). The filter vessel was fitted with a pressure guage which indicated the back pressure on the pump due to the filter and the nominal 1.5 inch PVC discharge piping returning filtered water to the pool.

Prior to each test run the filter was dismantled and thoroughly cleaned. The leaf basket at the skimmer box was cleaned regularly to avoid restrictions on the suction side of the pump. A total of five separate test runs were conducted with varying quantities of different filtration materials. The duration of test runs varied from 18 to 122 hours. A measured quantity of filtration material was taken and mixed with water to form a slurry. At the start of each test run the respective filtration material slurry was added slowly to the skimmer box so that the clean filter cloth was pre-coated with the filtration material.

The quantities of the various filtration products expressed in kilograms of dry material, used in each test were as follows:

| Test No. | Quantity of Filter Aid | Sample No. |
| --- | --- | --- |
| 1 | 0.466 | 068 |
| 2 | 0.7145 | 068 |
| 3 | 1.429 | 068 |
| 4 | 0.7145 | 129 |
| 5 | 1.295 | 066 |

The quantity of filtration product used in test No. 3 actually corresponded with the recommendation of the manufacturer of the product for the filter size used in the test (Johns-Manville).

During each test run the pump and filter unit were run for the total time shown in the graph (FIGS. 3 through 5) with each cycle representing the period between startup and shutdown of the pump on separate days. The cycles on the figure marked with an asterisk (*) represent periods during test No. 4 from the restarting of the pump to the stopping of the pump. The average pressure increase during the first, second, and third cycles for each of the tests were as follows:

| Test No. | AVERAGE PRESSURE INCREASE | | |
| --- | --- | --- | --- |
| | 1st Cycle | 2nd Cycle | 3rd Cycle |
| 1 | 0.17 lbs/in$^2$ | 0.2 lbs/in$^2$/hr | 0.33 lbs/in$^2$/hr |
| 2 | 0.33 lbs/in$^2$ | 0.15 lbs/in$^2$/hr | 0.22 lbs/in$^2$/hr |
| 3 | 0.77 lbs/in$^2$ | 0.58 lbs/in$^2$/hr | 0.20 lbs/in$^2$/hr |
| 4 | 0.12 lbs/in$^2$ | 0.08 lbs/in$^2$/hr | 0.08 lbs/in$^2$/hr |
| 5 | 0.51 lbs/in$^2$ | 0.12 lbs/in$^2$/hr | 0.11 lbs/in$^2$/hr |

Figure 3:
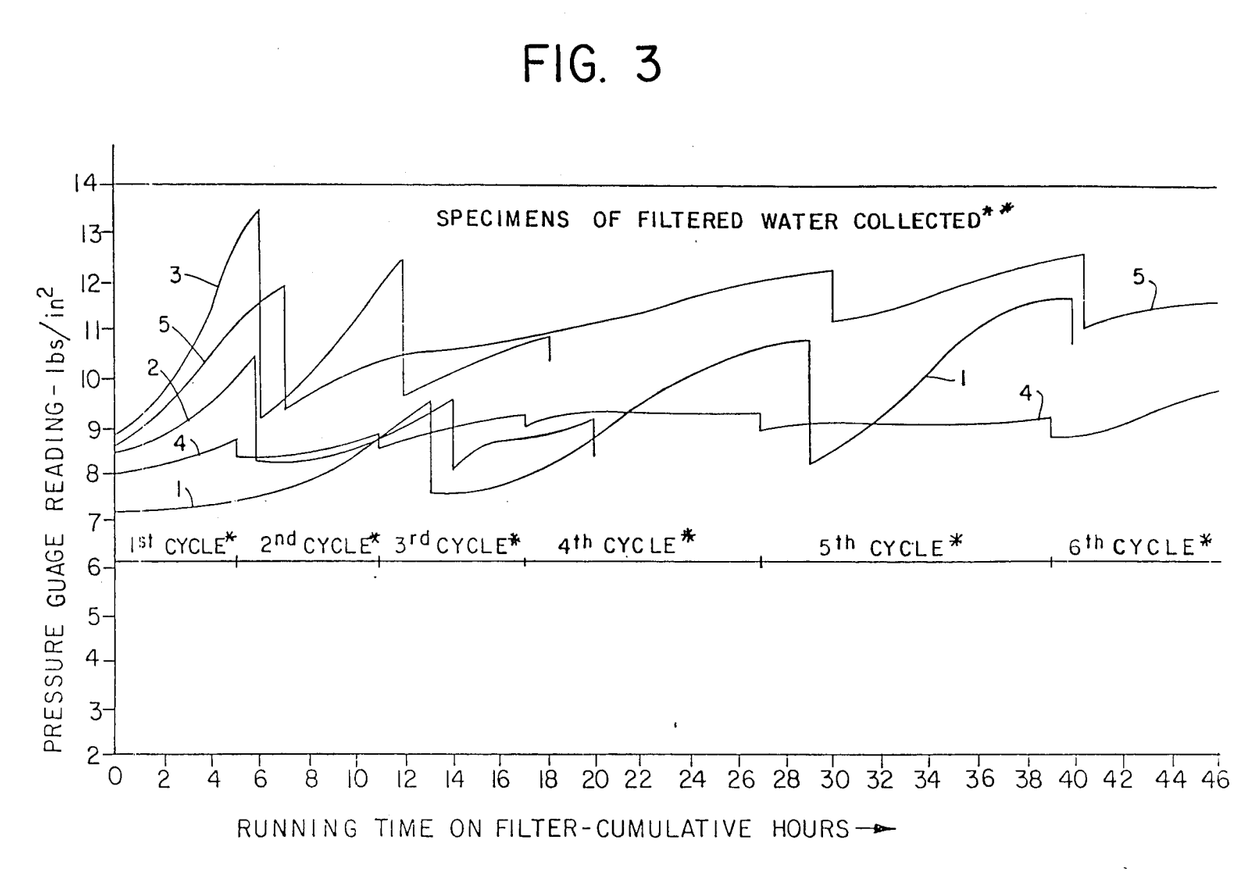
FIGS. 3 through 5 are graphs comparing the filtration characteristics of the products of the present invention with a commercially used filtration material.
Figure 4:
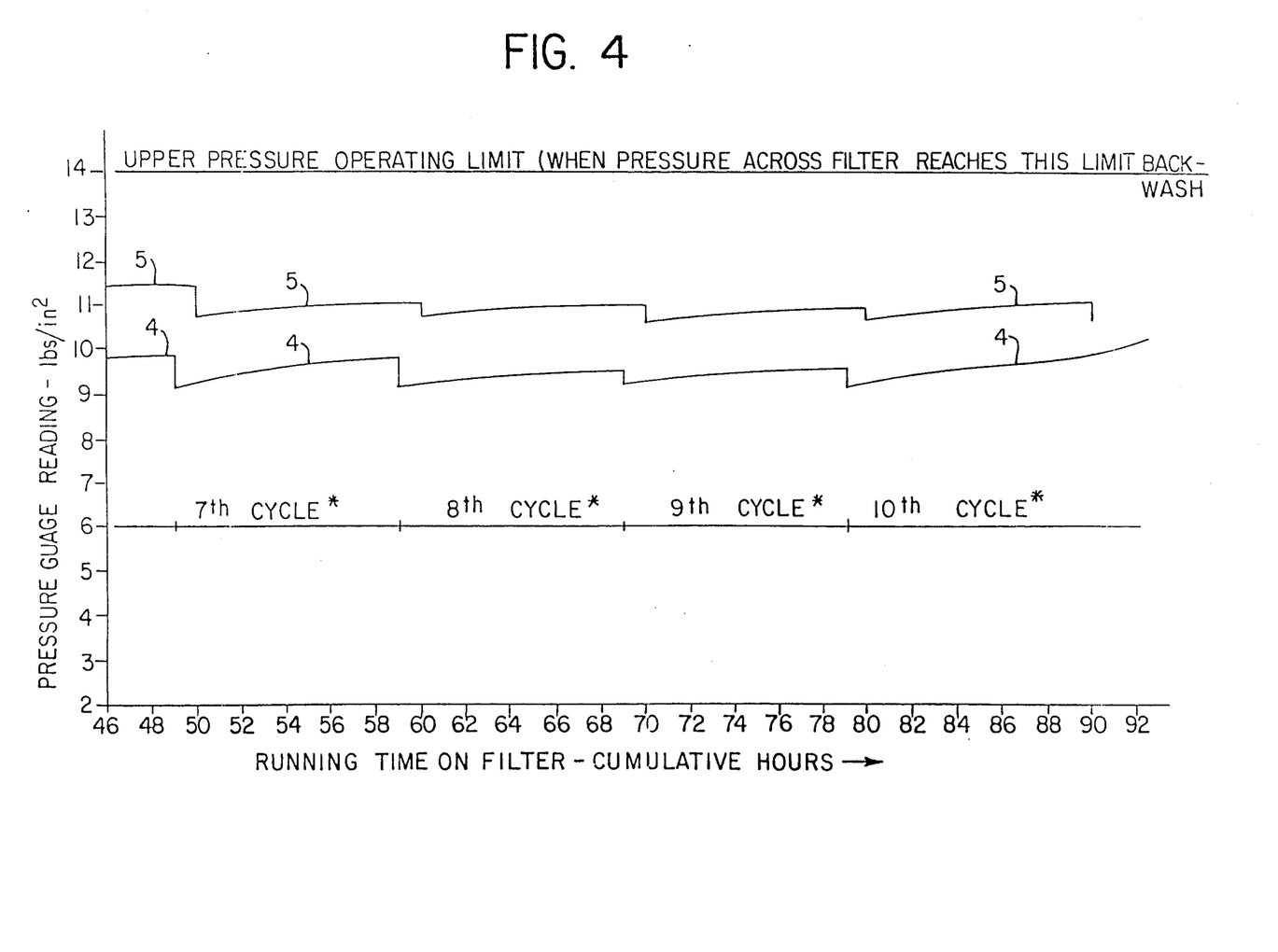
Figure 5:
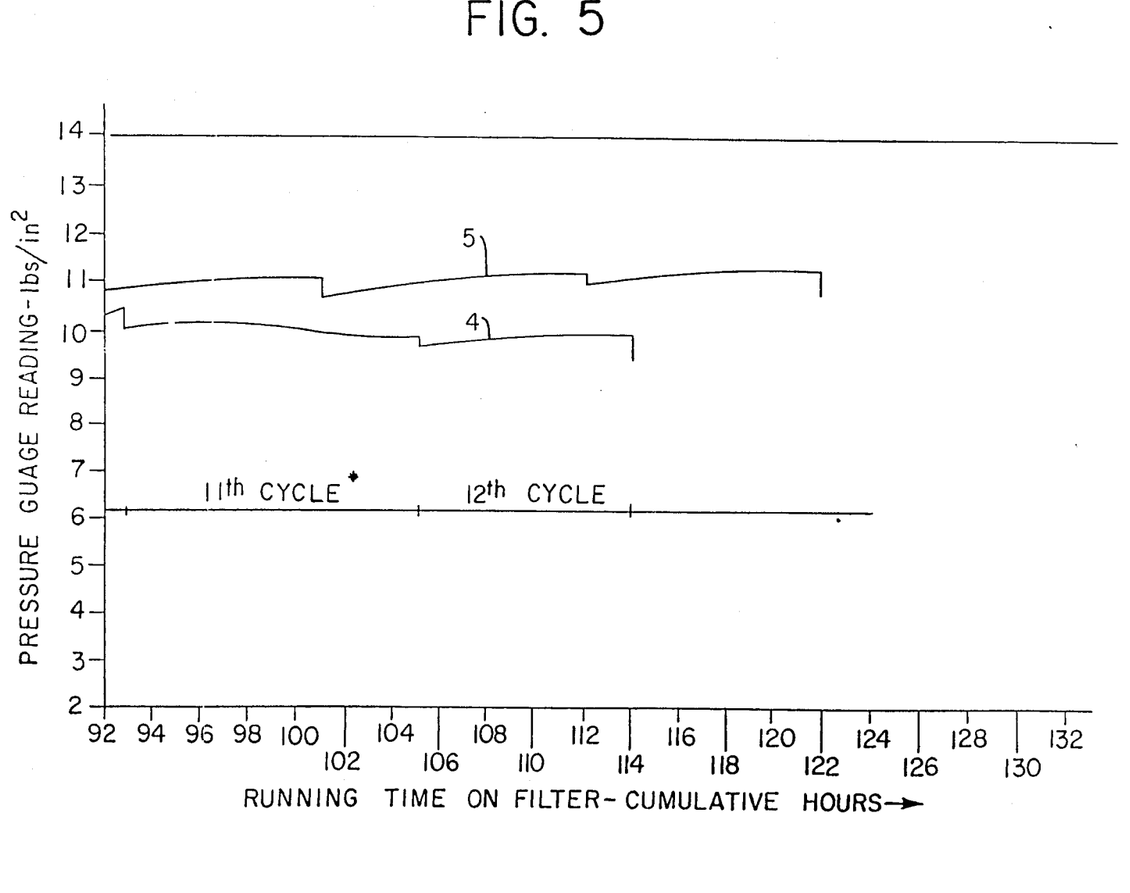

The pressure gauge readings were recorded at regular intervals throughout each test run and are shown graphically in FIGS. 3 through 5.

Comparable use was made of the pool by swimmers during each test and sediment disturbed from the floor of the pool by sweeping to create comparable filtering loads in each test. Chlorine was added at normal regular intervals to maintain residual chlorine at the desired level.

Excellent clarity of the filtered water returned to the pool was observed in all tests, and specimens of the filtered water were collected during the third cycle in tests Nos. 2, 3, and 4 for turbidity determinations. The turbidity of each specimen of filtered water was measured using HACH Nephelometric Turbidity Meter at the Research and Development Laboratory of Warman International Limited, as indicated by the double asterisk (\*\*) next to "SPECIMENS OF FILTERED WATER COLLECTED" in FIG. 3. The results were recorded as follows:

| TURBIDITY OF FILTERED WATER (N.T.U.'s) | |
|---|---|
| Test | |
| 1 | Not measured. Appeared excellent |
| 2 | 0.36 N.T.U.'s |
| 3 | 0.30 N.T.U.'s |
| 4 | 0.30 N.T.U.'s |
| 5 | 0.30 N.T.U.'s |

The results of the tests are shown in FIGS. 3 through 5 and indicate that filtration products produced from sugar mill boiler ash represented by Samples Nos. 066 and 129 give comparable performance to the diatomaceous earth filtration product presently known in the art and typified by Sample No. 068. The results suggest longer life expectancy for the pre-coats of mill ash filtration products than for diatomaceous earth at smaller quantities and comparable life expectancy and filtrate quality for mill ash filtration products to that of diatomaceous earth when they are dosed in equal quantities by weight on a dry basis.

The filtration products described herein have been demonstrated to have a longer filter cycle than diatomaceous earth and at the same time are able to as effectively as diatomaceous earth filter fine particulate material from liquids because the product includes a preselected quantity of fine ash particles below about 12 to about 15 microns. The wider particle size distribution of the filtration products of the present invention vis-a-vis diatomaceous earth makes it possible to store a greater amount of filtered material in the filter cake before it becomes clogged than in the case of diatomaceous earth.

As a basis for comparing filtering speeds, a standard procedure was adopted in which the rate of flow of a liquid through a bed of filtration material having a standard depth of 30 mm, in a column of water pressurized to a constant pressure of 35 kPa (5.0 lbs sq. in) was measured. This filtering speed was also measured under the same conditions for a standard grade of diatomaceous earth known in the art at "Hyflo Super-Cel".

The diatomaceous earth was given a flow rate index of 1.0, and a flow rate index of the other filtration products was calculated by a ratio of flow rates.

The following comparative tests demonstrate a commercially viable process for producing and controlling various grades of filtration material from sugar mill boiler ash.

A sample of ash from the "Solitude" mill in Mauritius, designated as Sample 074, was ground in a laboratory mill and screened (in a manner similar to the milling and classifying which takes place in a closed circuit wet grinding mill installation). Sample No. 074 was ground for five minutes and the products wet screened through a 180 micron sieve. The oversize material was returned to the mill and wet ground for a further 10 minutes and the product wet screened through a 180 micron sieve. The oversize material was returned to the mill and wet ground for a further 15 minutes and the product wet screened through a 180 micron sieve. The undersize material from each of these screening operations was combined and found to be 90% of the original unprocessed sample. This undersize material was designated Sample No. 118 and its Flow Rate Index was determined to be less than 0.1.

Sample No. 118 was then pumped with water through a 3" classifying hydrocyclone. This separated out the finer particles smaller than 12 to 15 microns which were contained in the overflow from the hydrocyclone. The balance of the material contained in the underflow from the hydrocyclone which principally had a particle size in the range of about 12 to 180 microns was designated, Sample No. 123 and its Flow Rate Index determined to be 1.1.

To show the effect on Flow Rate Index of the proportion of very fine particles present, three further samples were prepared consisting of Sample No. 123 with varying percentages of the less than 12 to 15 micron particulate material added from the overflow of the hydrocyclone. The percentages of less than 12 to 15 micron particulate material added to Sample No. 123 were 5.75%, 2.5%, and 1.0%, respectively, for combined samples designated Sample Nos. 126, 127 and 128 respectively. The Flow Rate Indexes for these samples were determined to be 0.12, 0.20, and 0.27, respectively.

These tests indicate that filtration materials of various grades can be made by grinding and classifying unprocessed sugar mill boiler ash—to ensure that the processed ash is of a requisite upper particle size—by removing the very fine particles from the ground and classified product, by further classifying and recombining various proportions of the fine particles previously removed to control the final grade of the filtration product.

The products of the present invention have been successfully tested for numerous other applications as a filter aid including filtration of any number of liquids including cleaning fluids, pineapple juice, transformer oils and beer.

What is claimed is:

1. A filtration product consisting essentially of inorganic bagasse ash particles derived from the combustion of bagasse fibre, said bagasse ash particles having been classified by size so that no greater than 25% by weight of said ash particles are of a particle size below about 12 to 15 microns and at least 90% by weight of said particles are smaller than about 375 microns and having an activated carbon content of below about 30% by weight based on the loss of ignition.

2. A filtration product according to claim 1 wherein the loss on ignition is below about 12% by weight.

3. A filtration product according to claim 1 including bagasse ash particles having a high activated carbon content said particles being derived from partially burnt or charred bagasse fibre resulting from the combustion of said bagasse fibre, said particles of high activated carbon content having an initial particle size in the range of about 375 to about 1700 microns and having been further treated to reduce their size so that at least about 90% by weight of said particles are below about 375 microns.

4. A filtration product in accordance with claim 1 having a flow rate index of between about 0.2 and about 10.

5. A filtration product in accordance with claim 4 having a flow rate index of between about 1.0 and about 3.5.

6. An adsorbent product derived from bagasse ash resulting from the combustion of bagasse fibre in a sugar mill boiler, said product consisting essentially of inorganic ash particles of high activated carbon content constituting partially burnt or charred portions of said bagasse fibre, said ash particles having been classified by size so as to exhibit a loss on ignition of at least about 40% by weight and having a particle size below about 1700 microns.

7. An adsorbent product according to claim 6 wherein said ash particles are derived from partially burnt or charred bagasse fibre predominantly having a particle size below about 1700 microns and above about 375 microns.

8. A process for manufacturing a filtration product from a starting material derived from the combustion of bagasse fibre, said starting material including bagasse ash particles of low activated carbon content and bagasse ash particles of a high activated carbon content, said process comprising the steps of separating by physical means the bagasse ash particles of low activated carbon content from the starting material and, by physical means, separating from said particles of low activated carbon content at least a substantial majority of those particles having a size below about 12 to 15 microns, so that said product contains no greater than 25% by weight of particles smaller than 12 to 15 microns, so that at least 90% by weight of said particles are smaller than about 375 microns.

9. A process according to claim 8 wherein said bagasse ash particles of a high activated carbon content are also separated out from said starting material and comprise those particles having a size in the range of about 375 to about 1700 microns.

10. A process according to claim 9 which includes the additional steps of reducing the particle size of said bagasse ash particles having a high activated carbon content to below about 375 microns and recombining with said bagasse ash particles of low activated carbon content a quantity of said reduced size particles calculated to impart a high activated carbon content to the filtration product.

11. A process according to claim 8 which includes the additional step of recombining with said bagasse ash particles of low activated carbon content a quantity of said bagasse ash particles having a particle size below about 12 to 15 microns calculated to impart a flow rate index between about 0.2 and about 10 to the filtration product.

* * * * *